Feb. 24, 1970 R. M. MALINICH ET AL 3,497,639

SIMULTANEOUS-CALL TELEPHONE TEST SYSTEM

Filed July 8. 1966 6 Sheets-Sheet 1

INVENTORS
R.M. MALINICH
D.J. MARIOTTI
T.M. STUMP
W.L. WINCHELL

BY Dicke & Craig
ATTORNEYS

INVENTOR.
R.M. MALINICH
D.J. MARIOTTI
T.M. STUMP
W.L. WINCHELL
BY
Dicke + Craig
ATTORNEYS Feb. 24, 1970 R. M. MALINICH ET AL 3,497,639

SIMULTANEOUS-CALL TELEPHONE TEST SYSTEM

Filed July 8, 1966 6 Sheets-Sheet 3

INVENTOR.
R. M. MALINICH
D. J. MARIOTTI
T. M. STUMP
W. L. WINCHELL

BY Dicke + Craig
ATTORNEYS

INVENTOR.
R.M. MALINICH
D.J. MARIOTTI
T.M. STUMP
W.L. WINCHELL

BY
Dicke & Craig
ATTORNEYS

INVENTOR.
R. M. MALINICH
D. J. MARIOTTI
T. M. STUMP
W. L. WINCHELL
BY Dicke + Craig
ATTORNEYS INVENTOR.
R. M. MALINICH
D. J. MARIOTTI
T. M. STUMP
W. L. WINCHELL
BY Dicke & Craig
ATTORNEYS United States Patent Office 3,497,639

Patented Feb. 24, 1970

3,497,639

SIMULTANEOUS-CALL TELEPHONE TEST SYSTEM

Richard M. Malinich and Donald J. Mariotti, Rochester, N.Y., Theodore M. Stump, Costa Mesa, Calif., and William L. Winchell, Silver Spring, Md., assignors to Stromberg-Carlson Corporation, Rochester, N.Y., a corporation of Delaware Filed July 8, 1966, Ser. No. 563,803
Int. Cl. H04m 3/28
U.S. Cl. 179—175.2 21 Claims

ABSTRACT OF THE DISCLOSURE

A telephone test system is disclosed wherein a Dial Pulse Controller applies electrical signals, such as pulses or tones, representing each of the digits of a call number to a selection circuit of a program field. The selection circuit is coupled to a plurality of sequentially activated switching circuits corresponding to the number of sequential digits in a call number. The selection circuit is adjustable to apply selective electrical signals to the switching circuits to preset the particular call number to be generated. A test tone is provided upon loading of the call number into the tested equipment to determine if the call has been completed.

The present invention relates in general to telephone communication systems, and more particularly to a device for facilitating the testing of telephone switchboard equipment through simultaneous automatic application of a plurality of calls thereto.

The normal procedures for checking out telephone switchboard equipment to determine that it is capable of operating properly under various conditions consists basically of the repeated and continuous application of call numbers thereto to determine that the equipment properly and completely accepts the dialed information and is capable of connecting the call through to the designated line circuit. However, as is well known, a true test of such switchboard equipment must necessarily include a close simulation of actual operating conditions for the equipment, which operating conditions necessarily include the acceptance and processing of a number of simultaneous calls. In addition to the determination that the equipment can correctly accept and process a plurality of call numbers simultaneously, such a testing of the equipment also makes possible a determination of the quality of the connections which are established through the switchboard. This is extremely important, since it is well known that certain undesirable operating conditions, such as cross-talk, become increasingly acute and more troublesome due to the physical nature of presently used telephone equipment as the number of calls handled by the equipment at a given time is increased.

While, as indicated above, it is desirable in testing telephone switchboard equipment to apply a number of simultaneous calls to the equipment, presently known equipment will not permit the simultaneous application of a plurality of calls to the equipment by a single individual. The results is that presently used testing procedures not only require an extensive amount of time on the part of service personnel, but also fail to provide the necessary information regarding the operability and quality of service provided under heavy traffic conditions.

It is therefore an object of the present invention to provide a device for simultaneously loading a plurality of calls into telephone exchange equipment.

It is another object of the instant invention to provide a device for generating impulses representing the ten available dialing digits and for simultaneously outpulsing groups of these digits in a fully automatic manner.

It is a further object of the instant invention to provide a device which is capable of outpulsing a plurality of call numbers represented by individual tone digits.

It is still a further object of the instant invention to provide a device for simultaneously outpulsing consecutive digits of a plurality of call numbers represented either by numerical correlated impulses or individual frequency tones representing the available dialing digits.

It is still another object of the instant invention to provide a device for outpulsing a plurality of calls in a simultaneous manner including indicating means for continuously monitoring the accurate operation of the device itself.

The present invention includes a controller arrangement providing a plurality of output lines providing impulses or selective dial tones representing the ten available dialing digits used to make up a call number. These output lines are applied to a program field where the individual lines may be manually connected in any desired combination to one of a plurality of groups of output lines associated particularly with one of the seven or more digits of the call number which is programmed for that particular group. The controller arrangement then provides seven or more output control pulses according to a manual setting of the arrangement, which pulses consecutively enable the output lines representing the first through last digit of all of the calls programmed on the program field. The result is the simultaneous loading digit by digit of a plurality of call numbers into the equipment to be tested. The system in accordance with the present invention also provides means upon completion of the loading of a plurality of call numbers into the equipment for applying a test tone through the equipment to the called line circuits to determine that a call has in fact been completed in each case. The arrangement additionally includes indicating means for monitoring the outpulsing of each digit programmed in the program field and other operating functions of the system thereby providing means, in the event of malfunction or improper operation of the equipment being tested, of determining whether or not the testing equipment itself is the cause of the malfunction.

These and other objects, features and advantages of the present invention will be more apparent from the following detailed description of the invention, when taken with the accompanying drawings, which illustrate two embodiments of the present invention, and wherein.

Figure 1:
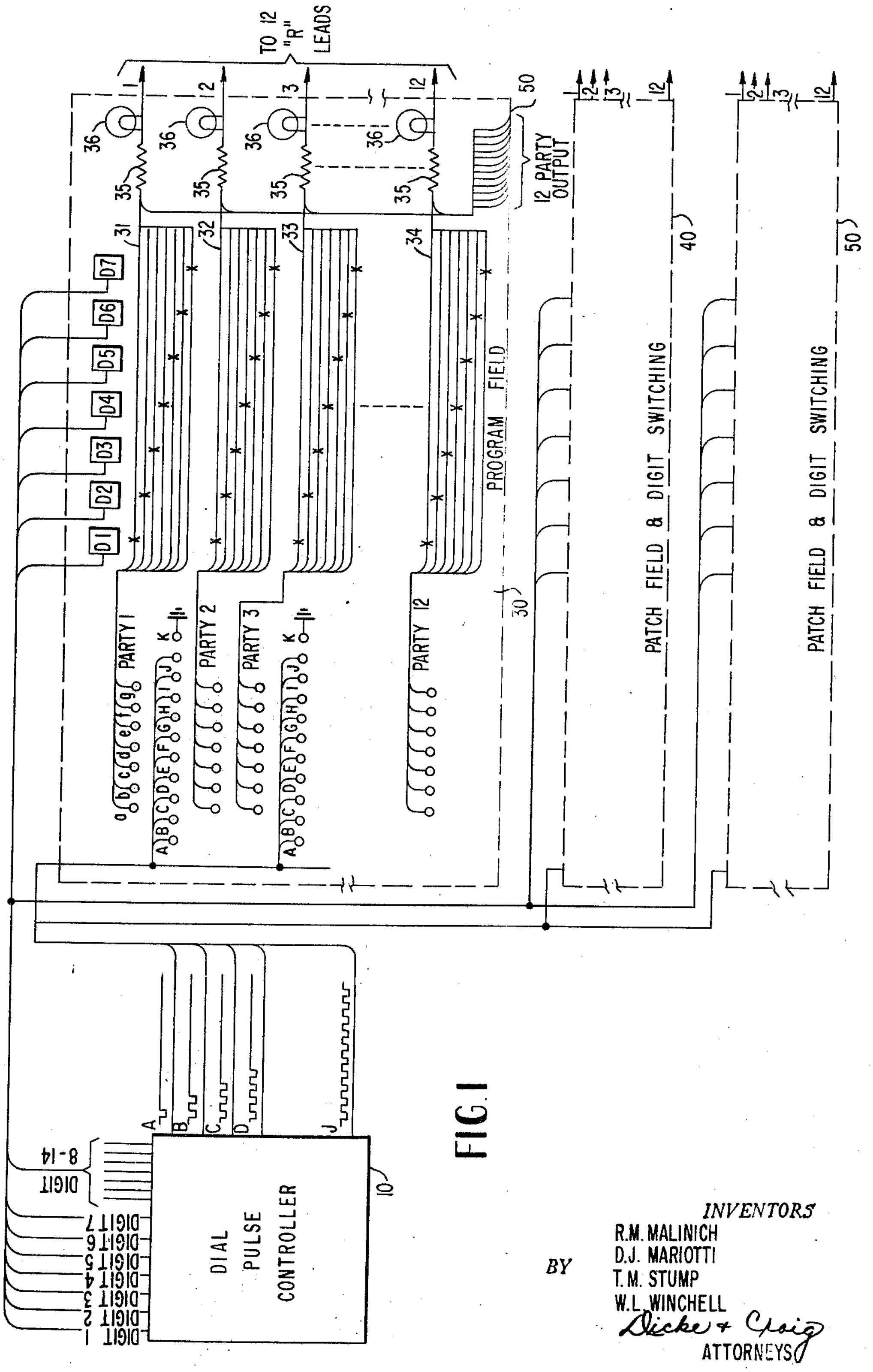
FIGURE 1 is a schematic diagram of the system of the present invention.

For purposes of providing a detailed description of the features and functional operation of the system in accordance with the present invention, an arrangement for effecting the simultaneous loading of thirty-six calls into telephone switchboard equipment is illustrated in the drawings and described below; however, an understanding of the principles of the present invention will clearly indicate that the arrangement disclosed herein may be easily modified by one of ordinary skill in the art to handle a larger or smaller number of calls in an identical manner.

Referring now to the drawings and more particularly to the general block diagram of the present invention illustrated in FIGURE 1, the essential subgroups of the system in accordance with the present invention are a dial pulse controller 10 and a plurality of program field units 30, 40 and 50. Each program field unit consists of a patch field containing, for example, 12 groups of 7 output lines each, 4 of these groups 31, 32, 33 and 34 are illustrated in connection with program field unit 30 in FIGURE 1. Seven lines are selected for each out group of output lines in each program field unit since the normal call number contains 7 digits; however, a larger number of lines may be provided in each group for outpulsing of call numbers containing a greater number of digits than 7, or, as will be indicated more clearly hereinafter, the program field units may be parallelled to provide a capacity for 14 digits for each call number.

Each of the corresponding 7 lines for each group of output lines in a program field unit contains a relay contact associated respectively with the relays $D_1$ through $D_7$, so that actuation of one of the relays will connect each corresponding line of the groups contained in the program field unit through a resistor 35 and indicating lamp 36 to an individual output line of the unit.

A patch field is provided at the input of each of the groups of lines in a program field unit so that impulses representing the available dialing digits may be applied to the lines of each group in any selective pattern or order so that different call numbers may be arbitrarily assigned to each group of output lines. Associated with the input terminals of the lines for each group representing a party in a program field unit are a plurality of output lines from the dial pulse controller 10, which output lines provide the simulated dialing impulses representing the available dialed digits representing a call number. These output lines from the dial pulse controller 10 may be patched into the input terminals, for example, terminals *a* through *g* associated with the lines of the group representing party 1 in program field 30, in any combination by way of banana plug patch cords, thumb wheel switches for digit selection or any other suitable arrangement for effecting application to the individual lines of each group of the desired dialing digits representing a complete call number.

The output terminals A through J connected to the output lines from the dial pulse controller 10 providing the simulated dialed impulses may be reproduced in each program field unit for each group of lines associated with a party or one group of these contacts may be associated with two or more groups of lines representing parties provided a sufficient number of patch cords are provided to make available association of given contacts with more than one line in a group or groups.

The manner in which a patching from the output lines of dial pulse controller 10 to the input lines to each individual group may place the call number of a party on an output line from the unit is to be explained with regards to FIGURE 1 in connection with party 1 of the program field unit 30. Patch lines can be connected between the contacts A through J to the input contacts *a* through *g* associated with the group of lines representing party 1 of the program field unit to establish a call number. For example, a call number 324–6879 is made by connecting terminals C to *a*, B to *b*, D to *c*, F to *d*, H to *e*, G to *f*, and I to *g* so that impulses from the dial pulse controller 10 representing the digits of this call number will be applied consecutively to the seven lines of the group representing party 1 of this program field unit. Proper patching of the contacts A through J to the input contacts *a* through *g* of the other parties in the program field will also provide dial impulses on each of the lines of each group representing a party so that as many as 12 call numbers will be represented by the groups provided by program field unit 30. In a like manner, the other program field units 40 and 50 may also be programmed to provide 12 call numbers so that 36 call numbers in total may be provided from the output lines of the system.

The dial pulse controller 10 also provides 14 control output lines representing digit 1 through digit 14. The lines digit 1 through digit 7 are applied in control of the relays $D_1$ through $D_7$, which will accommodate a normal 7 digit call number. However, should a greater number of digits than 7 be required, such as, for example, where digits representing area code or other special location or feature are required, the program field units may be connected in parallel by way of a special 12 party output terminal such as terminal 50 illustrated in connection with program field unit 30. Under these circumstances, the output control lines digit 1 through digit 7 are applied in control of the relays in program field unit 30 while the output control lines digit 8 through digit 14 are employed in control of the relays in program field unit 40. Calls having as many as 14 digits may then be handled by this arrangement.

The dial pulse controller 10 enables the control lines digit 1 through digit 14 in a consecutive manner so that the digits of each call programmed into the program field unit are outpulsed simultaneously and in a consecutive manner under control of this dial pulse controller 10.

A contact K connected to ground has been provided in the patch field in each program field unit for use in connection with call numbers of less digits than one or more call numbers which are also programmed into the patch field. As will be indicated hereinafter, the dial pulse controller 10 includes a means for setting the number of digits which are to be outpulsed by the system so that when that number has been reached, ground will be applied to the output to hold the line circuits associated with these lines. However, if certain call numbers programmed into the program field unit are of shorter length than the number set in the dial pulse controller, means must be provided for holding the line circuit associated with this party while the other lines having a longer call number in digit length are outpulsed. This means is the contact K connected to ground which may be connected to the empty or vacant terminals associated with the short call number to insure that the line circuit represented by the short call number once obtained will not be dropped due to the connection thereto of an open line.

The indicator lamps 36 which are connected in each of the output lines from each program field unit serve to provide a visual indication of the outpulsing of each digit on the line providing a means for determining when a digit is missed or dropped by the equipment, due to some malfunction thereof. Thus, if for some reason a call or calls are not completed which have been loaded from the program field unit into the switchboard a monitoring of the indicating lamps 36 will indicate whether this malfunction is due to improper operation of one or more of the groups within the program field unit itself.

The resistors 35 in each output line merely provide the normal impedance match between the lines of the program field units and the inputs to the switchboard equipment.

Figure 2:
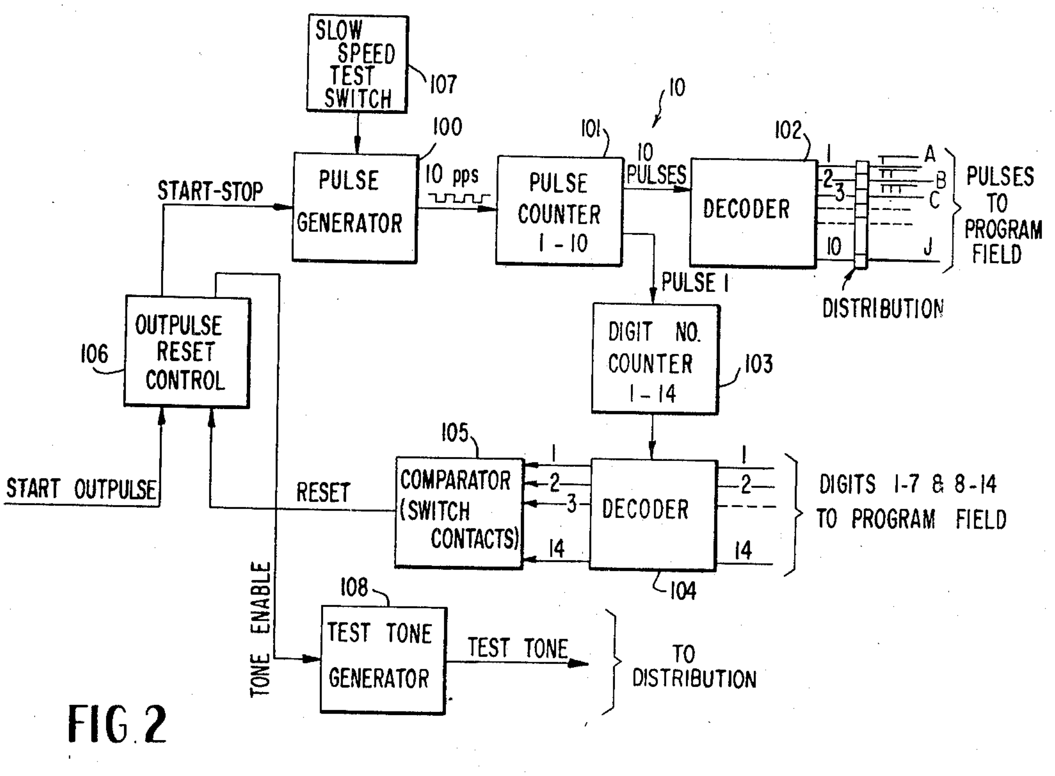
FIGURE 2 is a basic block diagram of the dial pulse controller of FIGURE 1.

Referring now to FIGURE 2, which shows a detailed block diagram of the dial pulse controller 10, a pulse generator 100 provides a 10 pulse per second output to a binary pulse counter 101, which serves as a digital-to-binary converter, providing for up to 16 binary combinations for control of a decoder 102 to provide the 10 output trains containing one to 10 pulses, respectively, which provide the dialing impulses for the program field units. In addition, an output representing the first count of the pulse counter 101 is applied to a digit number counter 103, a binary counter which advances upon completion of each 10 pulse sequence by the pulse counter 101. The digit number counter 103 is connected in control of a decoder 104 providing the necessary output control lines for operation of the relays in the program field units representing the one through 14 consecutive digits which may be programmed therein. The output of the decoder 104 is also utilized in combination with a comparator arrangement 105 which compares the state of the decorder 104 with the setting of the digit number switches used for selecting the maximum number of digits to be outpulsed to provide a reset signal when this maximum number has been reached by the unit. The reset signal from the comparator 105 is applied to the outpulse reset control 106 which serves as a start-stop arrangement for the pulse generator 100. The output from the outpulse reset control 106 is also applied as a tone enable control signal to test tone generator 108, which when enabled, provides an output test tone to the program field unit for application to each of the output lines thereof so as to provide a means for determining that the switchboard equipment under test in fact completes the call to each of the designated line circuits. A slow speed test switch arrangement 107 is associated with pulse geneartor 100 and serves to reduce the rate of the pulse generator to one pulse per second thereby slowing down the entire rate of the system so as to facilitate the monitoring of the indicator lamps provided in accordance with the invention to monitor the control of the test device itself.

Figure 3:
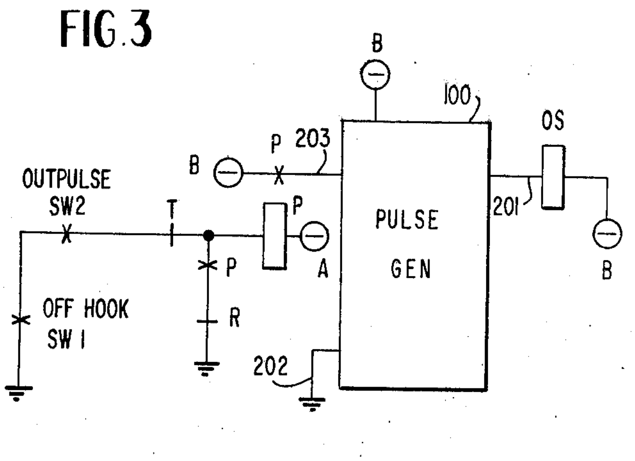
FIGURE 3 is a schematic diagram of the pulse generator of FIGURE 2.

FIGURE 3 discloses a detailed diagram of the pulse generator 100 of any known general configuration providing a 10 pulse per second ocntrol and may for example consist of a control relaxation oscillator which serves to connect output line 201 to the ground lead 202 periodically at a rate of 10 times per second so as to actuate the OS relay connected in the line 201 to a voltage source B at this prescribed rate. The OS relay in turn controls the pulse counter 101 in a manner to be described more fully in connection with FIGURE 4.

Figure 5:
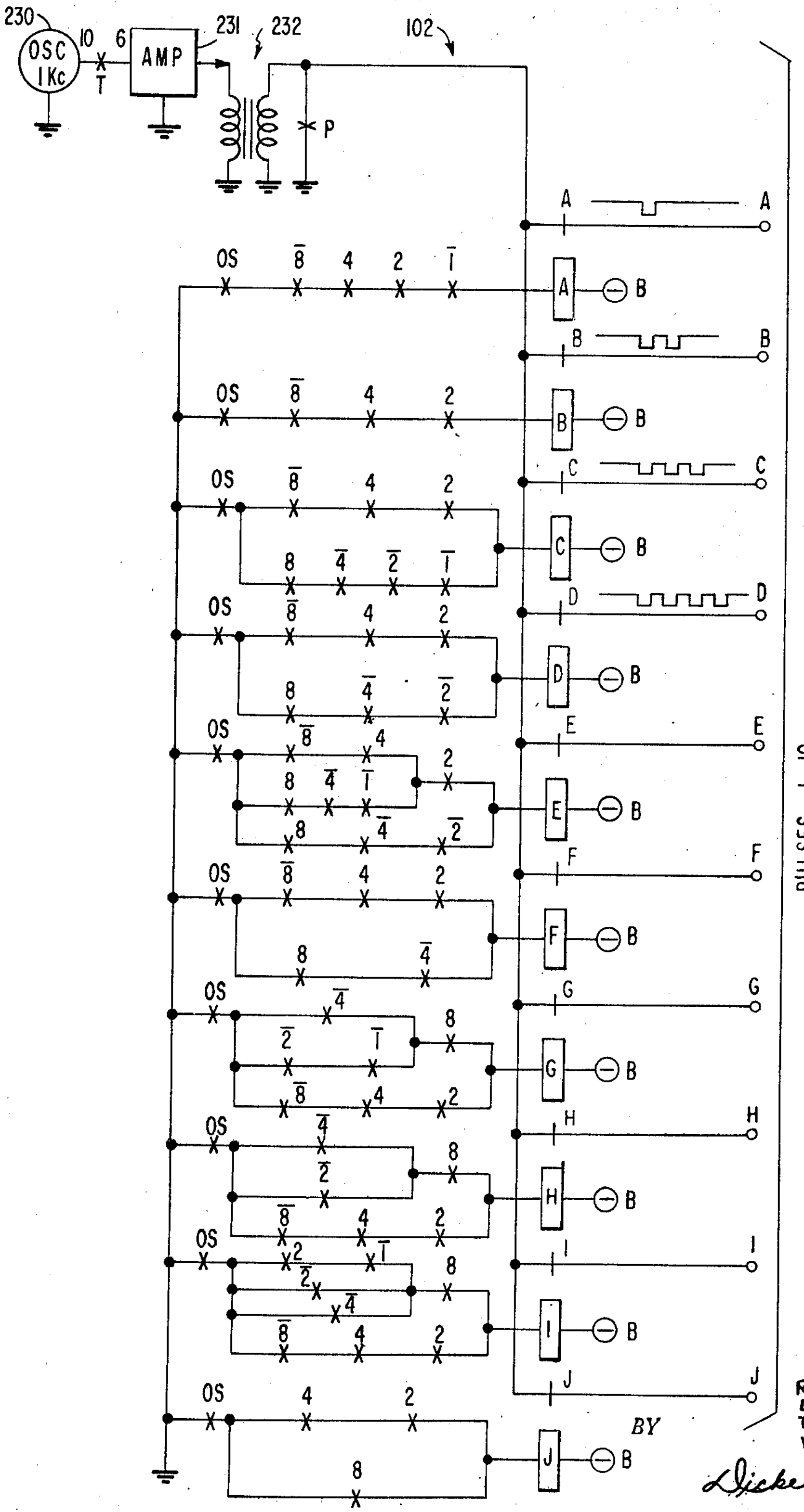
FIGURE 5 is a schematic diagram of the decoder associated with the pulse counter of FIGURE 2.

The pulse generator 100 is connected via line 203 to the power source B through the relay contacts of a relay P. Closing of the relay contact serves to connect the power source to the pulse generator initiating operation thereof. The relay P is connected betwen a power source A and ground through relay contacts of the relay T and the normally open switch contacts of an outpulse switch SW2 and an off hook switch SW1. Thus, operation of the relay P to start the pulse generator 100 is accomplished by closing the off hook switch SW1 and the output switch SW2 manually while the relay T to be described in connection with FIGURE 5 is disabled.

Figure 9:
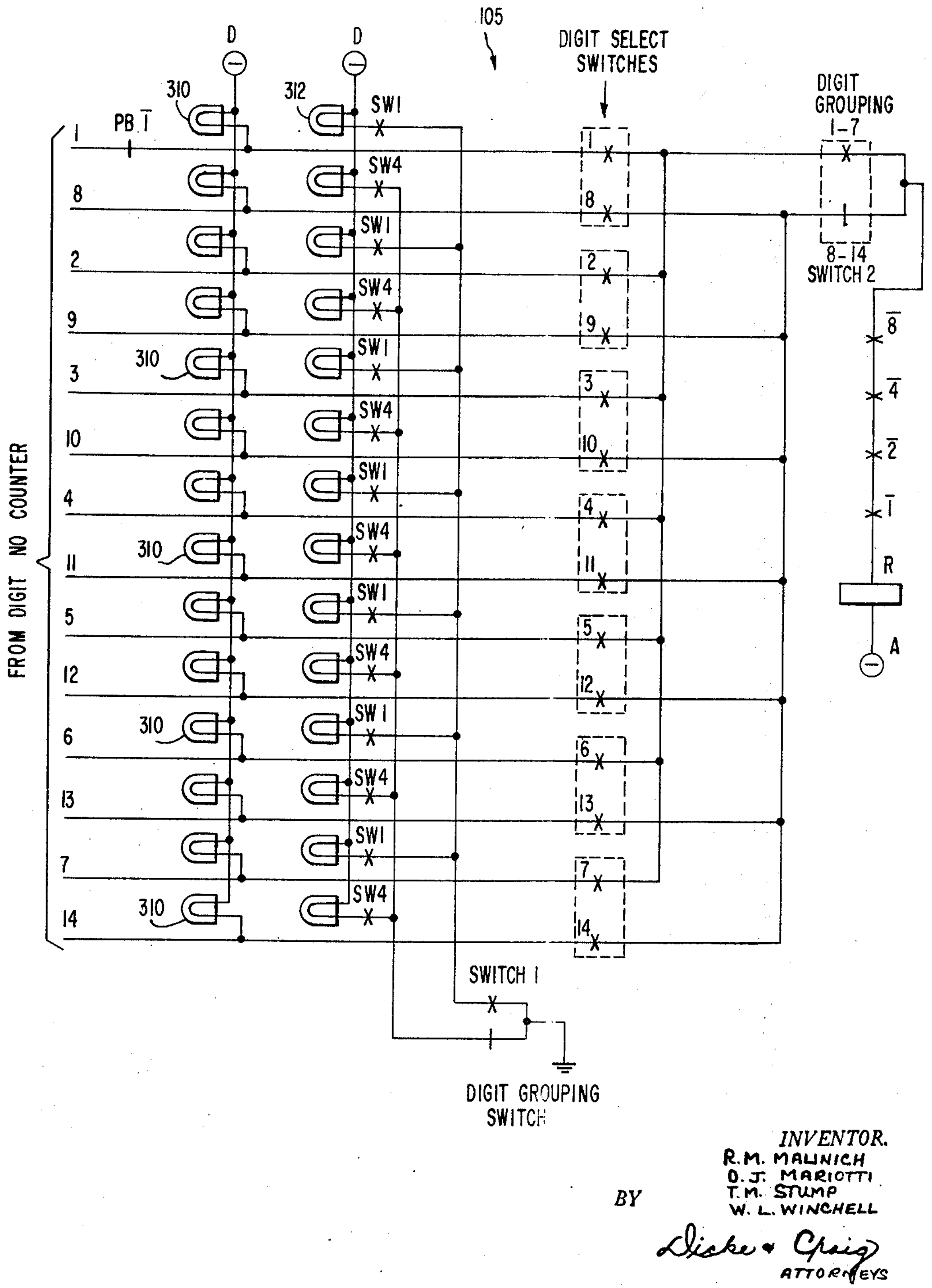
FIGURE 9 is a schematic diagram of the comparator of FIGURE 2.

A holding connection is also provided in association with the relay P which extends from one side of the relay to ground through the switch contacts of the relay itself and through the contacts of a relay R which serves as a reset relay and is described more fully in connection with FIGURE 9.

Figure 4:
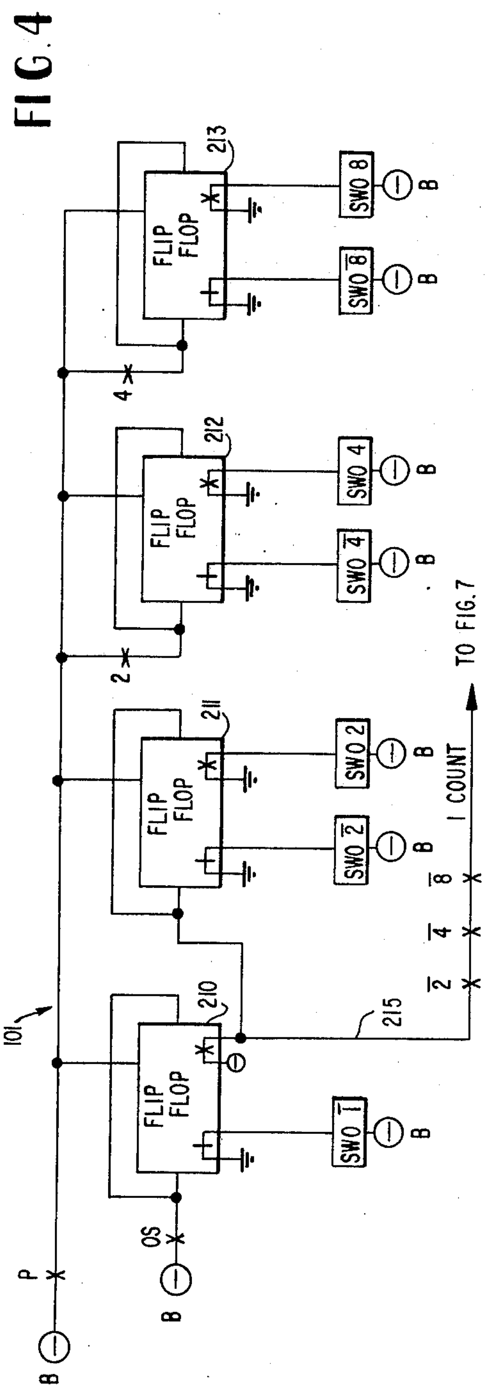
FIGURE 4 is a schematic diagram of the pulse counter of FIGURE 2.

Referring now to FIGURE 4 which illustrates the binary pulse counter 101 controlled by the pulse generator 100, this counter includes flips flops 210, 211, 212 and 213 connected in the conventional binary counter configuration with the power source B being connected to each of the flip flops 210–213 through switch contacts of the relay P and the power source B also being connected to the input of the flip flop 210 through the contacts of relay OS which controls the switching of the flip flops to advance the binary count.

The set and reset outputs of each of the flip flops 210 through 213, with the exception of the set output of flip flop 210, complete the path from power source B through an individual relay SWO to ground so that enabling of the particular output of the flip flop will result in enabling of the relay associated therewith. As is apparent from the designation provided for each of these relays SWO, their operation indicates one of the two binary states for each of the places in the binary count provided by the counter. The set output of flip flop 210 is not utilized in the manner of the other outputs of the flip flops in the counter 101 but is utilized to represent a count of 1 which is applied to the digit number counter 103, as illustrated in FIG. 2. The contacts of the relays SWO representing not 2, not 4 and not 8 are included in this output line to the digit number counter 103 so that only a binary count (0001) will produce an output on this line.

The several relays SWO providing the binary states in the binary count generated by the pulse counter 101 serve to control the decoder arrangement 102 providing the train of pulses ranging from 1 pulse through 10 pulses which serve to simulate the dialing impulses for a call number applied to the switch board equipment under test. This decoder 102 is illustrated in FIG. 5.

The decoder provides 10 output lines A, B, C, D, E, F, G, H, I and J which respectively provide an increasing number of output pulses ranging from one pulse through ten pulses for application to the program field units. The pulses are derived from the 10 pulse per second oscillator 100 which drives slave relay OS. Each of the output lines is connected through contacts of a relay associated with the particular lines so that the output line is complete only when the relay is disabled. These relays indicated as relays A through J corresponding to the output lines of the same designation, are connected from a power source B to ground through various combinations of the contacts associated with the SWO switches in the binary pulse counter 101. Each of these control lines to the individual relays also contains the contacts for the relay OS at the pulse generator. The relays A through J are energized starting with a counter of 6 (binary 0110) and when OS becomes energized by the pulse generator 100. On the count of 7, all of the relays except A are energized (B–J). On the count of 8, relays C through J are energized. This action continues until the count of 15 at which time only relay J is energized. In this manner, the signals at the line outputs are inverted pulse trains (one pulse at A, two at B, 10 at J).

Figure 6:
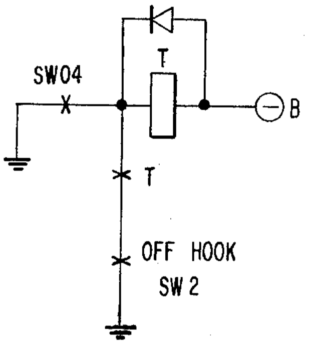
FIGURE 6 is a schematic diagram of a control relay arrangement for the decoder of FIGURE 5.

The oscillator 230 is connected to amplifier 231 through contacts of a relay T whose control arrangement is illustrated in FIGURE 6. The relay T is connected between power source B and ground through the switch contacts of switch SWO4 in the binary pulse counter 101 so that upon energization of this relay in the set output of the flip flop 212 representing a count of 4 (binary 0100) the relay will be actuated connecting the oscillator 230 through the amplifier 231. When outpulsing is complete, contact P opens, removing the ground across the secondary of transformer 232. This applies the 1000 c.p.s. signal to each of the output lines A through J of the decoder 102.

As seen in FIG. 6, the relay T is provided with a holding ground through the contacts of the relay itself and through contacts of off hook switch SW2 which is manually closed at the time of initial operation of the device. Upon enabling of the relay T, the line from the relay P (FIG. 3) associated with the pulse generator 100 which connects the relay to ground through the contacts of the relay T is opened so that the relay P is held only by the connection through the contacts of relay R to the holding ground.

Figure 7:
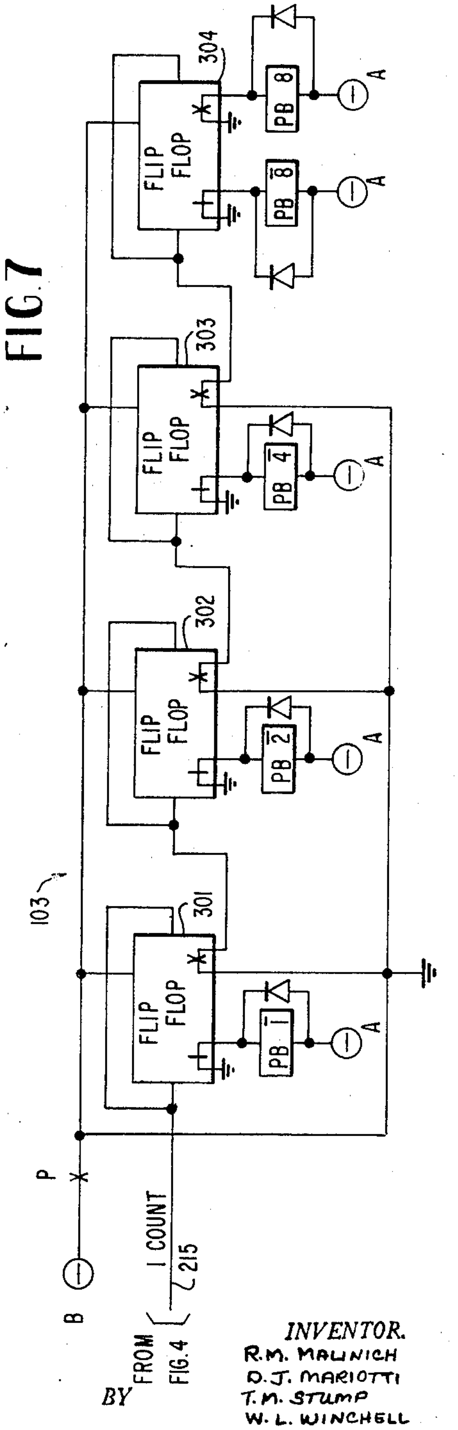
FIGURE 7 is a schematic diagram of the digit number counter of FIGURE 2.

As indicated above, the output of flip flop 210 in the binary pulse counter 101 indicating a count binary 1 (0001) is applied to the digit number counter 103 illustrated in FIG. 7. The digit number counter, like the binary pulse counter 101 includes a plurality of flip flops 301, 302, 303 and 304 connected in the standard or conventional counter configuration. The power source B is connected to each of the flip flops 301–304 through the contacts of relay P associated with the pulse generator 100 and the count is advanced in the counter through connection of the output line 215 from the flip flop 210 in the pulse counter 101 to the input of flip flop 301 in the digit number counter 103.

The flip flops 301 through 304 in the counter 103 serve to complete a path from potential source A through respective relays PB associated therewith to ground so as to enable these relays, so that the condition thereof will represent the binary states of the count provided by the counter 103. The contacts of the PB relays in the digit number counter 103 are provided in various combinations in the decoder arrangement 104, which is illustrated in detail in FIG. 8.

Figure 8:
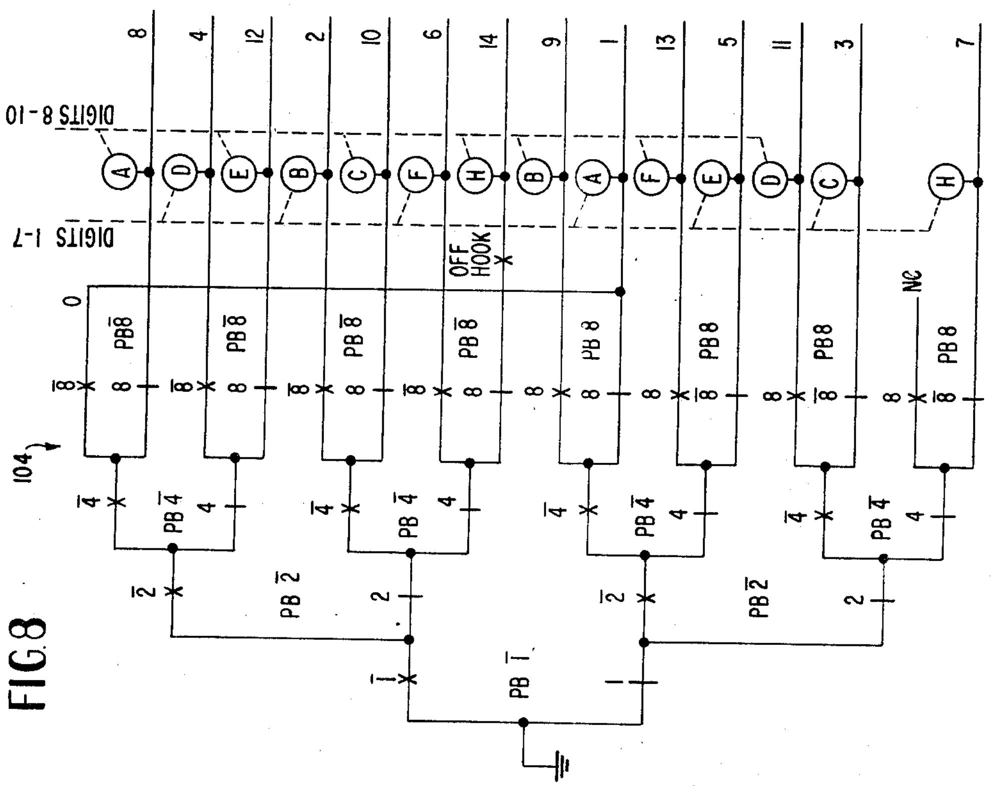
FIGURE 8 is a schematic diagram of the decoder associated with the digit number counter of FIGURE 7.

Referring now to FIG. 8, the decoder 104 consists essentially of a binary to digitial converter which utilizes the various binary states of the relays PB in the counter 103 to sequentially enable each of 14 output lines from the decoder by placing ground thereon. As indicated previously, these 14 lines represent the individual digits of the call number in the program field units which are outpulsed to the switchboard under tests.

,The 14 output lines from the decoder 104 are connected to the control relays in each of the program field units which control the individual output lines in the groups therein programmed for a particular call number. The 14 output lines from the decoder 104 are also applied to corresponding input lines of a comparator 105 illustrated in FIGURE 9.

Each of the input lines 1–14 to the comparator 105 are connected through a digit select switch arrangement into two groups of lines being connected through a digit grouping switch arrangement to a single input line to relay R which is in turn connected to power source A. The line to the relay R also includes the switch contacts representing the "not" condition of each of the relays SWO in the binary pulse counter 101. Thus, as the output lines from the decoder 104 are marked with ground potential in consecutive decimal order, the corresponding input lines in the comparator 105 will also be marked in consecutive decimal order.

At the beginning of operation, the maximum number of digits to be included in the call numbers programmed into the program field units is set on the digit select switch arrangement which may consist of a separate switch in each of the lines of the comparator 105 or a multi-position switch which serves the same function. In any event, setting of the digit select switch will provide a through connection on one of the lines of the comparator 105 so that when this line is marked from the decoder 104, and when the binary pulse counter reaches the end of its count so as to enable the contacts in series with the relay R in the comparator, a through circuit connection will be established between ground and the power source A through relay R thereby enabling the relay.

The enabling of relay A will immediately open the holding circuit to the relay P associated with the pulse generator 100 (FIG. 3) so that the pulse generator will be immediately disabled preventing further actuation of the relay OS connected thereto. Disabling of the relay OS will also disable the pulse counter 101 which is rendered inactive due to the disabling of the relay P which connects the power supply B to each of the flip flops thereof. Thus, a setting of the digit number for the maximum number of digits in the call numbers programmed into the program field units effects an automatic resetting of the entire device as soon as that particular number of digits has been outpulsed into the equipment under test.

A monetoring of the consecutive enabling of each of the lines from the decoder 104 is possible because of lamps 310 connected between a source of voltage D and one of the 14 lines in the comparator 105. A lamp 310 is provided for each line and the lamps in the actual construction of the device may be oriented so as to be in consecutive digital order. Thus, as each digit is outpulsed from the program field units, a lamp will be illuminated indicating each step of progressive outpulsing as it occurs.

In addition, a plurality of lamps 312, which may be of a different color from the lamps 310 are provided in a similar manner but are divided into two groups corresponding to the lines 1 through 7 and the lines 8 through 14. A switch arrangement SW1 serves to connect one or the other of these groups of lamps 312 between a source of potential D and ground. Thus, if the call numbers programmed into the program field units are only seven digits in length, the progressive outpulsing of the digits can be monitored on the individual group of lamps 312 associated with these seven digits.

Figure 10:
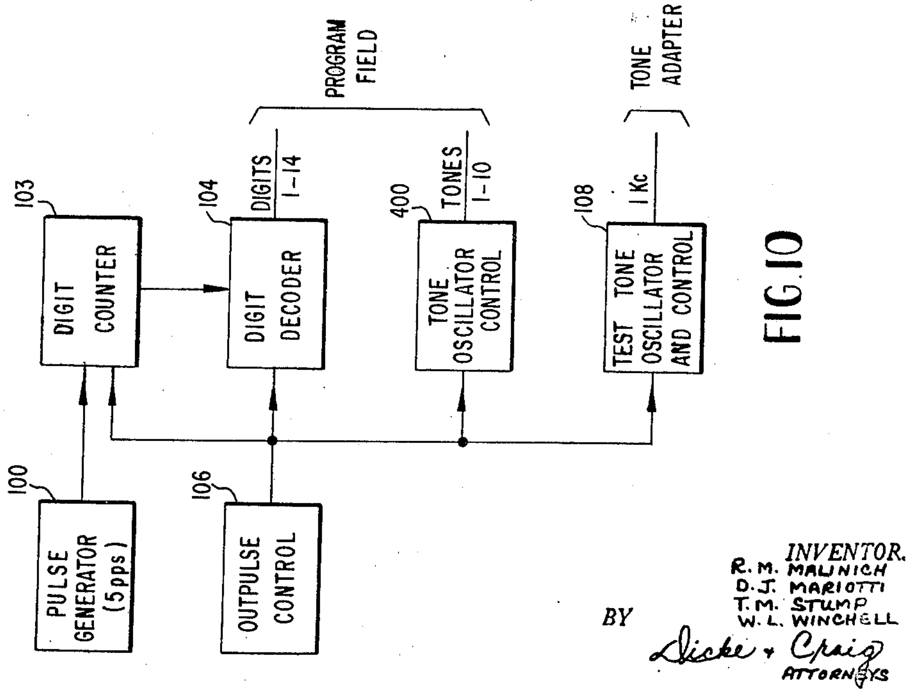
FIGURE 10 is a basic block diagram of another dial pulse controller using tone outpulsing.

As already indicated, the call numbers provided by the dial pulse controller 10 to the program field units need not consist of a series of pulses representing dialing impulse trans but may also be in the form of tone outpulsing providing ten different tone frequencies for each of the dialing digits of a call number. The use of tone outpulsing provides very little change in the basic arrangement of the invention as illustrated in FIG. 1; however, the dial pulse controller providing the tone outputs to the program field units is necessarily of slightly different configuration than the dial pulse controller 10 which provides the pulse trains to the program field units. FIGURE 10 provides an example of such a subscriber tone controller which may be used in accordance with the present invention. Those elements which correspond substantially to elements in the block diagram of FIGURE 2 have been provided with corresponding reference numeral identification so as to indicate this relationship.

A pulse generator 100 provides a five pulse per second output to a digit counter 103 which in combination with the digit decoder 104 serves as a binary to decimal converter providing the output pulses on 14 separate output lines for control of the relays in the program field units. An outpulse control 106 is connected to the digit counter 103 and the digit decoder 104 to initiate and control operation thereof. In this particular embodiment of the invention, a tone oscillator control 400 replaces the pulse counter 101 and decoder 102 of the previous embodiment providing, for example, ten separate tone generators each having a tone signal of different frequency. Such an arrangement may obviously also take the form of a master oscillator arrangement in combination with frequency multiplier combinations. In this way, the entire ten outputs from the tone oscillator control 400 may be simultaneously obtained, in contrast to the pulse counting technique required in connection with the pulse counter 101 and decoder 102 of the previous embodiment, a single signal from decoder 104 being sufficient to provide all 10 outputs from the tone oscillator control 400. Thus, it is apparent that the tone outpulsing arrangement provides for a simpler and more rapid functioning of the device in accordance with the present invention. As in the previous embodiment, a test tone oscillator and control 108 providing a one kilocycle signal for application to the program field units to determine that the calls programmed therein are, in fact, completed.

While we have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

We claim:

1. An automatic system loader for use with telephone communication equipment for simultaneously loading a plurality of telephone call numbers digit-by-digit into a switchboard comprising:

a plurality of output lines, a group of outpulsing lines equal in number to the number of digits in the call numbers to be loaded connected to each respective output line, plural relay means each having a contact in one corresponding outpulsing line of each group for simultaneously enabling each corresponding outpulsing line of each group in a prescribed order, dial pulse controller means providing electrical signals representing each of the available dialing digits of a telephone call number, and connection means for selectively applying the electrical signals from said dial pulse controller means to the outpulsing lines of each group in random patterns.

2. The combination as defined in claim 1 wherein said dial pulse controller means includes sequencer means for energizing said plural relay means in order so as to enable said outpulsing lines of each group in sequential order.

3. The combination as defined in claim 2 further including indicating means connected in each of said output lines to monitor the outpulsing therefrom.

4. The combination as defined in claim 2 wherein said connection means is provided in the form of banana plug patch cords extending between contacts connected to the output of said dial pulse controller means and said groups of outpulsing lines.

5. The combination as defined in claim 2 wherein said connection means is provided in the form of thumb wheel switches interconnecting contacts at the output of said dial pulse controller means and said groups of outpulsing lines.

6. The combination as defined in claim 2 wherein said dial pulse controller means includes pulse generator means providing a source of regularly spaced impulses, pulse counter means connected to said pulse generator means including switch means enabled in binary sequence under control of said pulse generator means, and first decoder means having a plurality of output lines and pulse source means connected thereto by said pulse counter means to provide an increasing number of pulses from said pulse source means on each succeeding output line of said decoder means as determined by the binary state of said switch means, said output lines providing the electrical signals representing each available dialing digit of a telephone call number.

7. The combination as defined in claim 6 wherein said sequencer means includes binary counter means connected to said pulse counter means for providing a binary count of the number of sequences carried out by said pulse counter means, and second decoder means connected to said binary counter means and having a plurality of outputs, said binary counter means connected to sequentially enable the outputs of said second decoder means with advancing binary count of said binary counter, said outputs being connected to said plural relay means.

8. The combination as defined in claim 7 further including comparator means connected to said second decoder means having manually settable reset means for disabling said pulse generator means upon enabling of a selective output of said second decoder means.

9. The combination as defined in claim 8 further including indicating means connected to each output of said second decoder means to monitor the number of the digit being outpulsed.

10. The combination as defined in claim 9 further including means connected to said pulse generator means for selectively reducing the output frequency thereof.

11. The combination defined in claim 1 wherein said electrical signals provided by said dial pulse controller means are electrical tone signals of differing frequency.

12. The combination defined in claim 1 further including test tone generator means for generating a test tone signal, and means for connecting said test tone generator means to each of said plurality of output lines in response to outpulsing of all programmed digits from said groups of outpulsing lines.

13. An automatic system loader for use with telephone communication equipment for simultaneously initiating a plurality of telephone calls comprising:

generating means producing a plurality of digit signals each representing a different digit 1 through zero, program field means for selectively grouping said digit signals into a plurality of patterns each representing a telephone call number, sequencer means for simultaneously outpulsing the digit signals in corresponding positions of each pattern digit-by-digit, and control means for disabling both said generating means and said sequencer means in response to outpulsing of all of said digit signals from said program field means.

14. The combination defined in claim 13 wherein said generating means includes pulse generator means for producing a series of regularly spaced pulses and means for applying in pulses from said pulse generator means in a group to $n$ output lines in an arithmetic progression.

15. The combination as defined in claim 14 wherein said means applying pulses to said output lines includes first binary counter means switchable to at least $n$ binary states by said pulse generator means and decoder means having a pulse source connected to each of said $n$ output lines and means responsive to the binary states of said first binary counter means to sequentially disable said output lines.

16. The combination defined in claim 15 wherein said sequencer means includes binary-to-digital converter means connected to said first pulse counter means to count each sequence of $n$ binary states thereof and sequentially enable $m$ control lines with the advancing count.

17. The combination defined in claim 16 wherein said binary-to-digital converter means includes second binary counter means connected to said first binary counter means and decoder means connected to said second binary counter means for enabling said $m$ control lines in response to the binary state of said second binary counter means.

18. The combination defined in claim 17 wherein said control means includes digit select means for selectively designating the number of digits to be outpulsed and comparator means connected to said decoder means for generating a reset signal in response to coincidence between the setting of said digit select means and enabling of the control line corresponding thereto in said decoder means.

19. The combination defined in claim 18 further including indicating means connected in each of said $m$ control lines to monitor the progressive outpulsing of said digit signals.

20. The combination as defined in claim 13 wherein said digit signals produced by said generating means are in the form of tone signals of differing frequency.

21. The combination as defined in claim 18 further including test tone generator means for outpulsing a test tone in response to said reset signal.

References Cited

UNITED STATES PATENTS 3,239,612 3/1966 McAllister -------- 179—175.2

WILLIAM C. COOPER, Primary Examiner